Sept. 22, 1970   A. R. ALLAN, JR., ET AL   3,529,406

FILTER FRAME SEAL

Filed Aug. 9, 1968

INVENTORS
ADRIAN R. ALLAN, JR
MARTIN R. FINK
BY
Kane, Dalsimer, Kane, Sullivan & Smith
ATTORNEYS

United States Patent Office 3,529,406
Patented Sept. 22, 1970

3,529,406
FILTER FRAME SEAL
Adrian R. Allan, Jr., and Martin R. Fink, Remsenburg, N.Y., assignors to Flanders Filters, Inc., Riverhead, N.Y., a corporation of New York
Filed Aug. 9, 1968, Ser. No. 751,616
Int. Cl. B01d 46/10
U.S. Cl. 55—502                                                    1 Claim

ABSTRACT OF THE DISCLOSURE

An air filter having a channel about its front periphery which is filled with a fluid of relatively high consistency. The channel is adapted to receive a mating retainer when the filter is positioned in its supporting housing, whereby the retainer is frictionally and sealably engaged by the fluid in the filter channel.

BACKGROUND AND SUMMARY OF THE INVENTION

This invention relates to a filter used to supply virtually dust-free and bacteria-free air to critical production or laboratory areas such as clean or white rooms. More particularly, it relates to a structure for sealably mounting the filter in a supporting housing.

For precise control of clean room air, it is common practice to circulate the air through a bank of one or more filters. Air filters having extremely high efficiencies in removing submicron sized particles from the air have been developed for use in applications of this type and are generally called "absolute" or "HEPA" filters in the industry. Such filters typically comprise a wood, chipboard, or metal frame which surrounds and supports a suitable filtering media such as glass, ceramic, or cellulose-asbestos paper. The paper is generally folded in accordion fashion to form a filter pack which is mounted and sealed in the supporting rigid frame.

In a conventional filter installation, the individual filter is mounted in a surrounding metal holding frame. A gasket of neoprene rubber or other similar material is secured to the front fact of the filter frame, and is designed to contact an inwardly turned peripheral flange in the holding frame. A suitable clamping mechanism is then provided to press the filter frame and its front gasket against the flange to present leakage of the air around the outside of the filter.

The conventional sealing structure has proven to be unsatisfactory in many applications however, since slight unfiltered air leaks often develop across the front sealing gasket. Such leaks commonly result from normal deterioration of the gasket material after long use, or from abrasions incurred during shipment and assembly. While in some industrial applications such leaks are of little consequence, in other applications where a high degree of purity is required, even the slightest leaks are totally unacceptable. This latter situation is usually the case where "absolute" filters are installed.

It is therefore an object of the present invention to provide a filter assembly wherein unfiltered air leakage around the filter is entirely eliminated. More particularly, it is an object of this invention to provide a filtering structure which does not rely on a rubber gasket as a sealing element.

It is a further object of this invention to provide a filter assembly wherein the filter may be easily and quickly assembled in or removed from its supporting housing. An additional object is to provide a structure for retaining the filter in its housing and which does not require a clamping mechanism of any type to press the filter frame against a flange in the housing.

In a broad sense, this invention relates to a structure for both sealing and retaining a filter frame in its supporting housing. The filter frame is provided with a circumferential channel or groove about its front periphery which is filled with a fluid of high consistency, such as petrolatum. The supporting housing includes a retainer having a cross-sectional shape corresponding to that of the frame groove, such that when the frame is pressed against the retainer in the housing, the retainer enters the petrolatum-filled groove to sealably engage the frame. Thus not only does the contact between the petrolatum and the housing retainer completely block the passage of air around the outside of the frame, but it also frictionally retains the filter frame in its proper position.

Additional objects and advantages of the present invention will become apparent to those skilled in the art from the following detailed description.

DESCRIPTION OF THE PREFERRED EMBODIMENT

Figure 1:
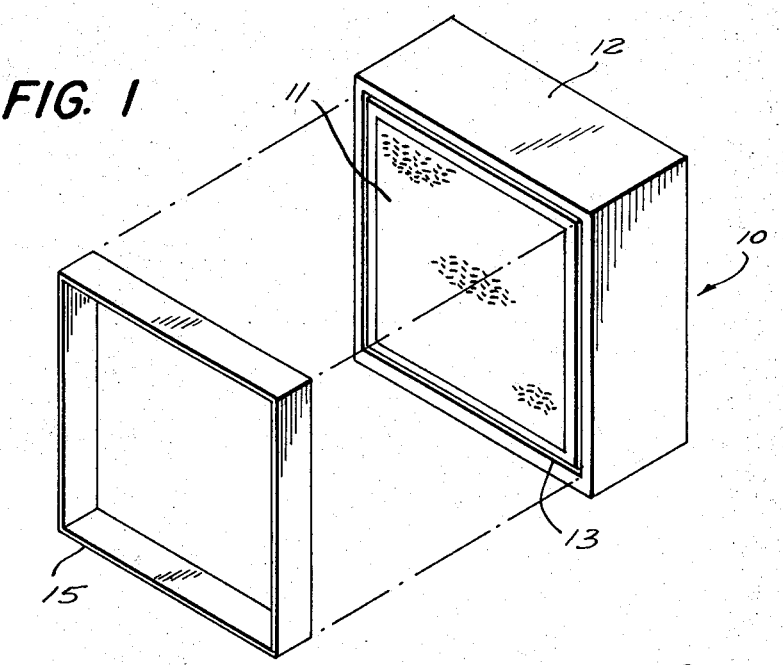
FIG. 1 is an exploded perspective view of the filter frame and its supporting retainer.

Referring to the drawings, FIG. 1 illustrates the general manner in which the filter 10 is joined to the retainer 15 of the housing. The filter 10 comprises a filter pack 11 which typically comprises a sheet of filtering media folded in accordion fashion. A filter frame 12 surrounds and supports the pack in a conventional manner. The frame 12 may be made from any suitable material such as wood, chipboard, or metal.

The front face of the filter frame includes a continuous circumferential or peripheral channel 13. The channel 13 is initially filled with a fluid 14 having a high consistency at room temperature and which, when melted, may be easily poured into the groove. Several hydrocarbon fluids, such as household petrolatum, or the Parmo products sold by the Humble Oil & Refining Company which have a consistency similar to that of petrolatum, have been found to be very satsifactory for this purpose. Such fluids are characterized as being semisolid at room temperature, and also subject to easy deformation.

The housing for the filter 10 is of conventional design and thus has not been illustrated in detail herein. A representation portion of the housing is illustrated at 16. Suffice it to say that the housing includes a retainer 15 having a cross-sectional configuration (square in the illustrated embodiment) corresponding to that of the channel 13. The retainer is made from sheet metal or any other suitable material, and is mounted in the housing in an airtight manner.

Figure 2:
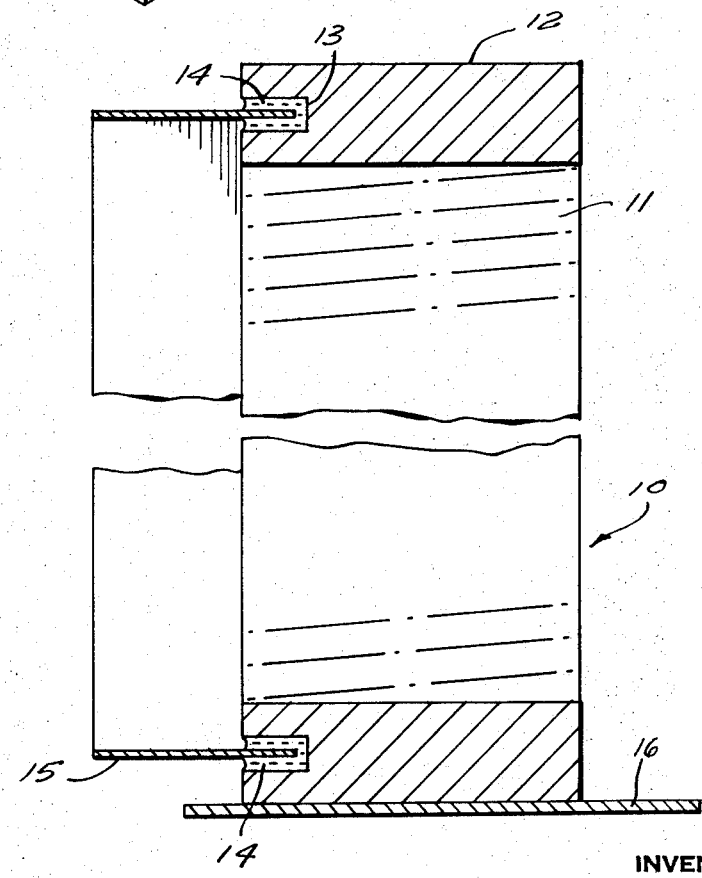
FIG. 2 is a horizontal sectional view showing the filter frame mounted on the retainer and resting on the floor of the housing.

In use, the filter 10 is mounted in the housing by merely pressing the filter against the retainer 15 in such a manner that the retainer enters the fluid-filled channel 13. Suitable guides (not illustrated) may be positioned in the housing to ensure entry of the retainer into the groove during the assembly operation. In this regard, it will be understood that the filter normally rests on the floor of the housing, the floor being parallel to the lower edge of the retainer 15 and spaced therefrom a distance sufficient to permit proper entry of the retainer into the channel 13 of the filter.

entry of the retainer 15 into the fluid-filled channel 13 as shown in FIG. 2 results in an absolute air seal between the two members. In addition, it has been found that the consistency of the fluid 14 is sufficient to frictionally maintain the relative positioning of the filter in the housing without the use of clamps or other external means. Thus the two members are quickly and easily assembled merely by pressing them together, and just as easily removed by pulling them apart. In many applications, especially where smaller sized filters are utilized, this self-securing feature is sufficient to maintain the assembly even where no other supporting surface or floor for the filter is employed. In other words, the retainer 15 will support the entire weight of the filter 10.

While a particular strutural embodiment of the present invention has been described in detail herein, it should be understood that modifications will readily occur to one skilled in the art without departing from the spirit of the invention. Thus the scope of the invention is to be determined by that of the appended claim only.

What is claimed is:

1. A structure for sealably connecting a filter in a supporting housing comprising, a filter comprising a frame surrounding and supporting a pack of filtering material thereacross, said frame having a continuous circumferential channel about the front periphery thereof, said channel being substantially filled with a fluid having a consistency substantially the same as that of petrolatum, and a supporting housing surrounding said frame including [a] retainer means mounted thereto in sealing engagement therewith, said retainer including a cross-sectional configuration corresponding to that of said frame channel with the forward portion of said retainer being positioned within said channel and extending into said fluid, whereby said fluid in said channel is frictionally and sealably engaging said retainer to maintain the relative positioning of said filter in said housing and to assure that all of the air passing between the interior of said housing adjacent to said filter and the exterior of the filter passes through said filter and said retainer.

References Cited

UNITED STATES PATENTS

| 629,739 | 7/1899 | Baulieu | 55—355 |
| 686,813 | 11/1901 | Learned | 55—355 |
| 1,702,976 | 2/1929 | Moore | 285—10 |
| 2,373,565 | 4/1945 | Hupp | 55—355 |
| 2,915,322 | 12/1959 | Dunlop | 285—10 |
| 3,280,541 | 10/1966 | Soltis | 55—483 |
| 3,345,806 | 10/1967 | Bullock et al. | 55—341 |
| 3,423,908 | 1/1969 | Hart | 55—483 |

FRANK W. LUTTER, Primary Examiner

B. NOZICK, Assistant Examiner

U.S. Cl. X.R.

277—135; 285—10